United States Patent [19]

Melton et al.

[11] Patent Number: 5,096,789
[45] Date of Patent: Mar. 17, 1992

[54] METHOD AND COMPOSITION FOR CHLOROALUMINATE MOLTEN SALTS HAVING A WIDE ELECTROCHEMICAL WINDOW

[75] Inventors: Tammy J. Melton, DePere, Wis.; John S. Wilkes, Larkspur, Colo.

[73] Assignee: The United States of America as represented by the Secretary of the Air Force, Washington, D.C.

[21] Appl. No.: 516,488

[22] Filed: Apr. 30, 1990

[51] Int. Cl.$^5$ .......................................... H01M 10/39
[52] U.S. Cl. ...................................... 429/112; 429/199
[58] Field of Search ........................ 429/188, 112, 199; 204/39, 60

[56] References Cited

U.S. PATENT DOCUMENTS

| | | | |
|---|---|---|---|
| 3,616,301 | 10/1971 | Miyata et al. | 204/39 |
| 3,778,356 | 12/1973 | Miyata et al. | 204/39 X |
| 4,409,168 | 10/1983 | Mrazek | 429/112 X |
| 4,546,055 | 10/1985 | Coetzer et al. | 429/112 X |

Primary Examiner—Stephen Kalafut
Attorney, Agent, or Firm—Thomas C. Stover; Donald J. Singer

[57] ABSTRACT

Composition and method for preparing a chloroaluminate molten salt at room temperature having a wide electrochemical window is provided. The salts include aluminum chloride and an organic chloride salt combined in a mole ratio of about 1-1 and a sufficient amount of alkali metal chloride added thereto to buffer said salts to Lewis acid-base neutrality, which is maintained by the latter additive, which neutrality is necessary for the above wide window. The so-buffered salts being molten at room temperature, provide an improved, high energy electrolyte for light-weight, durable batteries and for other applications.

21 Claims, No Drawings

METHOD AND COMPOSITION FOR CHLOROALUMINATE MOLTEN SALTS HAVING A WIDE ELECTROCHEMICAL WINDOW

STATEMENT OF GOVERNMENT INTEREST

The invention described herein may be manufactured and used by or for the Government for governmental purposes without the payment of any royalty thereon.

BACKGROUND OF THE INVENTION

1. Field of the Invention

This invention relates to a method for obtaining a wide electrochemical window in molten salts particularly in chloroaluminate molten salts.

2. The Prior Art

Chloroaluminate molten salts feature a range of Lewis acidity comparable to Bronsted acidity present in water. Just as pH greatly affects the chemistry and electrochemistry of aqueous solutions, the chloroacidity is a major determinant in speciation, reactivity and electrochemistry in chloroaluminates. Chloroaluminate molten salts are mixtures of aluminum chloride and a chloride donor, which is usually an alkali metal chloride or organic chloride. The most studied chloroaluminate molten salts are the mixtures $NaCl/AlCl_3$, $BPC/AlCl_3$ and $MEIC/ALCl_3$, where BPC is 1-(1-butyl) pyridinium chloride and MEIC is 1-methyl-3-ethylimidzolium chloride. The latter two binary molten salts have the advantage of having compositions with melting points below room temperature, i.e. they are room temperature molten salts or ionic liquids.

Chloroaluminate molten salts with melting points below room temperature are attractive candidates for battery electrolytes. In one example, 1-methyl-3-ethylimidazolium chloride and aluminum chloride, herein $MEIC-AlCl_3$, many of the physical, chemical and electrochemical properties of the molten salt, depend on the composition, i.e., the relative proportions of MEIC and $AlCl_3$. The maximum voltage that a battery cell can deliver is determined by the decomposition potentials of the electrolyte. The difference between the anodic and cathodic decomposition limits is called the electrochemical window of the electrolyte.

The window in the $MEIC-AlCl_3$ melts depends on the chemical species present, which is determined by the composition. The value for the molten salts is about 2.4 V, compared with about 1.5 V for water based electrolytes. While 2.4 V is a good window, the molten salts have a particular composition where the window expands to 4.5 V. Unfortunately that point, with the wide window, is where the MEIC and $AlCl_3$ are equal, at 50 mole fraction each (called the neutral point) and variations from such equivalence, can significantly reduce the 4.5 window. However, keeping a neutral composition is like balancing on a knife edge. For example, any chemical or electrochemical process that consumes or generates acidic or basic species will remove the melt from its neutral composition.

What is needed is a method to maintain such neutrality and such wide window despite the above chemical activity in chloroaluminate molten salts. However such method has not previously been available.

In related prior art, U.S. Pat. No. 4,463,071 to Gifford et al. (1984) relates to the use of chloroaluminate molten salts as electrolytes with the addition of alkali metal salts, including sodium chloride, to such electrolytes. However, the Gifford reference discloses such salts as a source of cations for intercalation into polymer or other electrodes during the cell operation (Col. 2 lines 18–21 and Col. 6, lines 15 and 16). That is, Gifford's cathodes will not function without such cation supply.

The present invention however, adds alkali metal chloride to chloroaluminate molten salts for a different purpose, to buffer them, as more fully discussed below.

Accordingly, there has now been discovered, a method for obtaining a wide electrochemical window in chloroaluminate molten salts by adding a reagent that acts as a Lewis buffer for neutral composition in such molten salts. A Lewis buffer is a material that prevents or reduces changes in the Lewis acidity or basicity of a solution. In the case of chloroaluminate molten salts, the buffer must affect the chloride ($Cl^-$, the Lewis base) and the heptachloroaluminate ($Al_2Cl_7^-$, the Lewis-acid) and keep the concentrations thereof very low.

SUMMARY OF THE INVENTION

Broadly the present invention provides a method for obtaining and maintaining a wide electrochemical window in chloroaluminate molten salts comprising, adding a sufficient amount of at least one alkali metal chloride thereto to buffer the salts to a Lewis acid-base neutraity.

Also provided, according to the present invention, is a chloroaluminate molten salt having a wide electrochemical window comprising, aluminum chloride and organic chloride salt, each of a mole ratio of about 1 to 1 and a sufficient amount of at least one alkali metal chloride added thereto, to buffer the salts to Lewis acid-base neutrality which is maintained by the latter additive.

DESCRIPTION OF PREFERRED EMBODIMENTS

A preferred composition and method therefor is a chloroaluminate molten salt of 1-methyl-3-ethyimidazolium chloride and aluminum chloride, herein $MEIC-AlCl_3$ in about a 1-1 mole ratio. To these molten salts is added an alkali metal chloride salt, e.g., sodium chloride, to buffer said molten salts to a Lewis acid-base neutrality.

Thus the invention provides method and composition for chloroaluminate salts which are molten at room temperature and thus suitable for battery electrolytes. The usefulness of the invention is that energy producing reactions disturb the neutrality of such molten salts and cause a shift away therefrom which considerably narrows the electrochemical window from, e.g., 4.5 V to 2.4 V or below. The addition of the Lewis buffer to such salts, allows the neutral composition thereof and thus the wide electrochemical window, to be maintained during battery discharge.

While $AlCl_3$ is added to MEIC according to the present invention. $AlCl_3$ could be replaced by $AlBr_3$ if desired, within the scope of the invention. However $AlCl_3$ is preferred so as to have a halide aluminate salt that is molten at room temperature.

Alkali metal chloride added to an $MEIC-AlCl_3$ melt, acts as a Lewis neutral buffer as noted above. It is believed that such additive acts as a source of chloride ion to reduce excess $Al_2Cl_7^-$ and the soluble sodium ion precipitates chloride ion if excess MEIC is added. The $Cl^-$ and $Al_2Cl_7^-$ and the effect of the additive on them, may be observed by cyclic voltammetry.

The alkali metal chloride additive is preferably NaCl but can also be KCl, RbCl, CsCl, or LiCl as desired, within the scope of the invention.

Before introducing such additive the chloroaluminate salts are mixed generally in a 1-1 mole ratio. However the aluminum chloride can be in excess of such ratio, (e.g., 1-1.1 to 2.0), to enhance the solubility of the melt, when NaCl is the additive. NaCl requires an acidic melt, to be soluble therein, as opposed to a binary melt with a preponderance of MEIC. On the other hand, when the mole ratios of the above two components are nearly equal, (eg 0.9 to 1.1), lithium chloride will dissolve in the melt regardless of which component (organic chloride salt, such as MEIC, or $AlCl_3$) predominate. An alternate, but chemically equivalent, method for preparation of the buffered chloroaluminate molten salt is to mix an alkali metal tetrachloroaluminate salt (eg. $NaAlCl_4$) with 1—1 mole ratio MEIC-$AlCl_3$.

Accordingly, the ratio of the organic chloride salt and the aluminum chloride are said to be about 1-1 mole ratio, which includes a range of 0.8-1.2 mole ratio or a greater range in either direction, as desired, within the scope of the present invention.

As indicated above the solubility of NaCl in the low temperature molten salts of the invention, is dependant on the composition of the melt. Table 1 below, lists the solubility of NaCl as a function of the melt composition, i.e., the mole fraction of $AlCl_3$. The solubilities were measured by atomic absorption spectroscopy. In acidic compositions, NaCl is quite soluble. In basic compositions, NaCl is almost insoluble. An acidic melt made neutral with excess NaCl cannot be made basic by additions of MEIC due to precipitation of excess Cl- as NaCl.

The following Table is given as an illustration of the invention and should not be construed in limitation thereof.

TABLE I

| Composition mole frac $AlCl_3$ | NaCl Solubility mol/L | $[Al_2Cl_7-]$ mol/L |
|---|---|---|
| 0.33 | $8.6 \times 10^{-3}$ | 0 |
| 0.40 | $7.3 \times 10^{-3}$ | 0 |
| 0.45 | $11.0 \times 10^{-3}$ | 0 |
| 0.50 | $7.5 \times 10^{-3}$ | 0 |
| 0.53 | 0.5080 | 0.5630 |
| 0.55 | 0.9279 | 0.9478 |
| 0.60 | 1.8224 | 1.946 |

Cyclic voltammetry showed that the sodium chloride is acting as a buffer for the neutral composition. The cyclic voltammogram of an acidic melt, showed $Al_2Cl_7$- reduction as the cathodic limit and $AlCl_4$- oxidation as the anodic limit.

Thus the invention provides method and composition to buffer chloroaluminate molten salts to the neutral point to allow for utilization of an extraordinarily wide electrochemical window for, eg. electrochemical cells employing room temperature molten salts as the electrolyte. Such salts, including MEIC—$AlCl_3$, as buffered by the metal chlorides of the present invention, can remain molten in a temperature range of from −40° F. to 165° F. and thus is highly suitable as an electrolyte for rechargeable (or secondary) batteries as well as for non-rechargeable (or primary) batteries. The wide electrochemical window of such an electrolyte permits for greater energy density, ie. high power, long life batteries at reduced weight.

Such electrolyte can also be advantageously used in fuel cells and photoelectric cells as well as in electroplating applications.

Further, the buffering of chloroaluminate molten salts to Lewis acid-base neutrality is very useful in other applications since the wide electrochemical window can be used for systems that normally would change the acidity and thus the cathodic or anodic electrochemical limits. Thus one can study metal ions and organic compounds in a medium that is non-complexing.

We claim:

1. A method for obtaining a wide electrochemical window in chloroaluminate molten salts comprising adding a sufficient amount of at least one alkali metal chloride thereto buffer said salts to Lewis acid-base neutrality.

2. A method for obtaining a wide electrochemical window in chloroaluminate molten salts wherein aluminum chloride is a substantial component comprising adding a sufficient amount of at least one alkali metal chloride thereto to buffer said salts to Lewis acid-base neutrality.

3. The method of claim 2 wherein said aluminum chloride is present in a mole fraction of 0.49 or more and an excess of said alkali metal chloride is added to buffer said salts to said Lewis acid-base neutrality and to maintain such neutral salt composition even during energy producing reactions in said salts.

4. The method of claim 2 wherein said alkali metal chloride is selected from the group consisting of NaCl, KCl, RbCl, CsCl and LiCl.

5. The method of claim 4 wherein said alkali metal chloride is NaCl.

6. The method of claim 2 wherein said chloroaluminate molten salts include aluminum chloride and an organic chloride salt.

7. The method of claim 6 wherein said salts include aluminum chloride at a mole fraction of 0.40 or more and said salts are molten above and below 70° F.

8. The method of claim 7 wherein said organic chloride salt is 1-methyl-3-ethylimidazolium chloride so that said salt is identified as MEIC-$AlCl_3$, wherein said $AlCl_3$ is present in a mole fraction of 0.50 or more and an access of alkali metal chloride is added thereto to buffer said salts to said neutrality.

9. The method of claim 2 wherein said window is up to 4.5 volts-wide.

10. The method of claim 2 wherein the so-buffered salts serve as an electrolyte in an electrochemical cell having a discharge potential of up to 4.5 volts.

11. The method of claim 10 wherein said buffer allows the neutral composition of said salts to be maintained during cell discharge.

12. A chloroaluminate molten salt having a wide electrochemical window comprising aluminum chloride and an organic chloride salt each of a mole fraction of 0.33 to 0.67, and with a sufficient amount of alkali metal chloride added to buffer said salts to Lewis acid-base neutrality which is maintained by the latter additive.

13. The molten salt of claim 12 having an excess of said alkali metal chloride added thereto.

14. The molten salts of claim 12 wherein said salts are molten down to 19° F.

15. The molten salts of claim 12 wherein said alkali metal chloride is selected from the group consisting of NaCl, KCl, RbCl, CsCl and LiCl.

16. The molten salts claim 15 wherein said alkali metal chloride is NaCl.

17. The molten salt of claim 12 wherein said aluminum chloride and said organic chloride salt are maintained at or near an equal mole fraction or 0.5 mole fraction each.

18. The molten salt of claim 12 wherein said organic chloride salt is 1-methyl-3-ethylimidazolium chloride or MEIC.

19. The molten salt of claim 12 wherein said window is up to 4.5 volts wide.

20. The molten salt of claim 12 wherein the so-buffered salts serve as an electrolyte in an electrochemical cell having a discharge potential of up to 4.5 volts.

21. The molten salt of claim 20 wherein the buffer allows the neutral composition of said salts to be maintained during cell discharge.

* * * * *